US012427073B1

(12) United States Patent
Ariosa et al.

(10) Patent No.: US 12,427,073 B1
(45) Date of Patent: Sep. 30, 2025

(54) PORTABLE SIT-TO-STAND LIFT STOWED ON A TRANSPORT WHEELCHAIR

(71) Applicants: Anne Marie Ariosa, Towson, MD (US); Roberta Anne Ariosa, Towson, MD (US)

(72) Inventors: Anne Marie Ariosa, Towson, MD (US); Roberta Anne Ariosa, Towson, MD (US)

(*) Notice: Subject to any disclaimer, the term of this patent is extended or adjusted under 35 U.S.C. 154(b) by 54 days.

(21) Appl. No.: 18/612,622

(22) Filed: Mar. 21, 2024

Related U.S. Application Data

(60) Provisional application No. 63/454,593, filed on Mar. 24, 2023.

(51) Int. Cl.
*A61G 7/10* (2006.01)
*A61G 5/12* (2006.01)

(52) U.S. Cl.
CPC ........... *A61G 7/1074* (2013.01); *A61G 5/128* (2016.11)

(58) Field of Classification Search
CPC .. A61G 7/1007; A61G 7/1017; A61G 7/1042; A61G 7/1046; A61G 7/1059; A61G 7/1063; A61G 7/1074; A61G 7/1088; A61G 7/1098; A61G 5/1002; A61G 5/1059; A61G 5/1062; A61G 5/125; A61G 5/128; A61G 5/14; A61H 3/008; A61H 3/04; A61H 2003/046
See application file for complete search history.

(56) References Cited

U.S. PATENT DOCUMENTS

| | | | | |
|---|---|---|---|---|
| 4,141,094 | A * | 2/1979 | Ferguson | A61G 5/1054 297/DIG. 10 |
| 4,300,249 | A * | 11/1981 | Taylor | A61G 5/00 5/604 |
| 4,999,862 | A * | 3/1991 | Hefty | A61G 7/1042 D12/128 |
| 5,333,333 | A * | 8/1994 | Mah | A61H 3/04 280/30 |
| 5,651,149 | A * | 7/1997 | Garman | A61G 7/1044 5/81.1 R |
| 8,646,125 | B2 * | 2/2014 | Stryker | A61G 7/1046 5/81.1 R |
| 11,033,447 | B1 * | 6/2021 | Boghozian Savarani | A61G 7/1007 |
| 2002/0104698 | A1 * | 8/2002 | Kanno | A61G 5/1054 180/65.6 |
| 2006/0097557 | A1 * | 5/2006 | Tholkes | A63B 21/00072 297/330 |
| 2007/0227787 | A1 * | 10/2007 | Kuramoto | A61G 5/045 180/65.1 |
| 2009/0158523 | A1 * | 6/2009 | Burak, Jr. | A61G 7/1046 5/81.1 R |
| 2010/0207354 | A1 * | 8/2010 | Hunziker | A61G 5/14 297/316 |

(Continued)

*Primary Examiner* — George Sun
(74) *Attorney, Agent, or Firm* — ARIOSA

(57) ABSTRACT

This is a lightweight and portable sit-to-stand lift that can be easily assembled. It comes with components that can be stowed on a transport wheelchair. The lift is designed with a grab bar in the handicap bathroom, which supports the wheelchair user and eliminates the need for a heavy base as part of the lift. It features a low-cost, non-backdrivable gear system and is driven forward and reversed by the hand-held flexible ratchet, contributing to greater portability.

2 Claims, 21 Drawing Sheets

TRANSPORT WHEELCHAIR
WITH TOOLBOX

(56) References Cited

U.S. PATENT DOCUMENTS

| | | | | |
|---|---|---|---|---|
| 2012/0255118 | A1* | 10/2012 | Hammond | A61G 7/1096 5/86.1 |
| 2013/0111660 | A1* | 5/2013 | Wilson | B66F 7/025 5/86.1 |
| 2015/0202102 | A1* | 7/2015 | Dunham | A61G 5/1059 297/344.13 |
| 2017/0127842 | A1* | 5/2017 | Sayed | A61G 5/128 |
| 2017/0246061 | A1* | 8/2017 | McClean | A61G 5/14 |
| 2021/0154065 | A1* | 5/2021 | Brown | A61H 3/04 |
| 2022/0062080 | A1* | 3/2022 | Pitt | A61G 7/109 |
| 2023/0121597 | A1* | 4/2023 | Lamb | B60B 33/0002 135/67 |

* cited by examiner

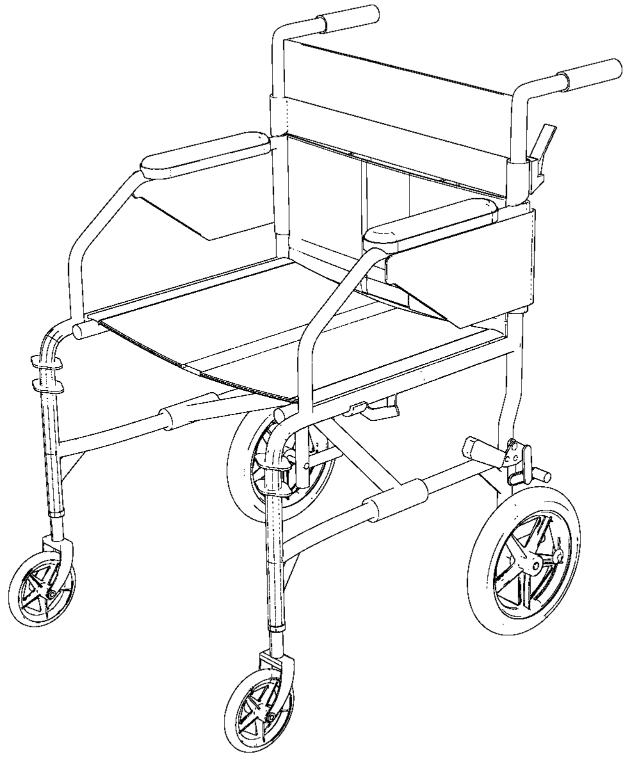
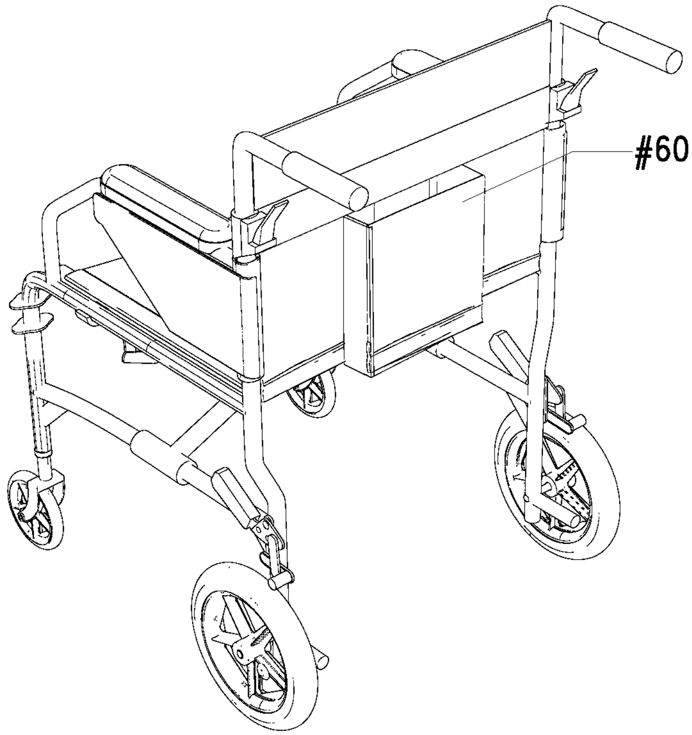
FIG. 1 – TRANSPORT WHEELCHAIR

FIG. 2 – TRANSPORT WHEELCHAIR WITH TOOLBOX

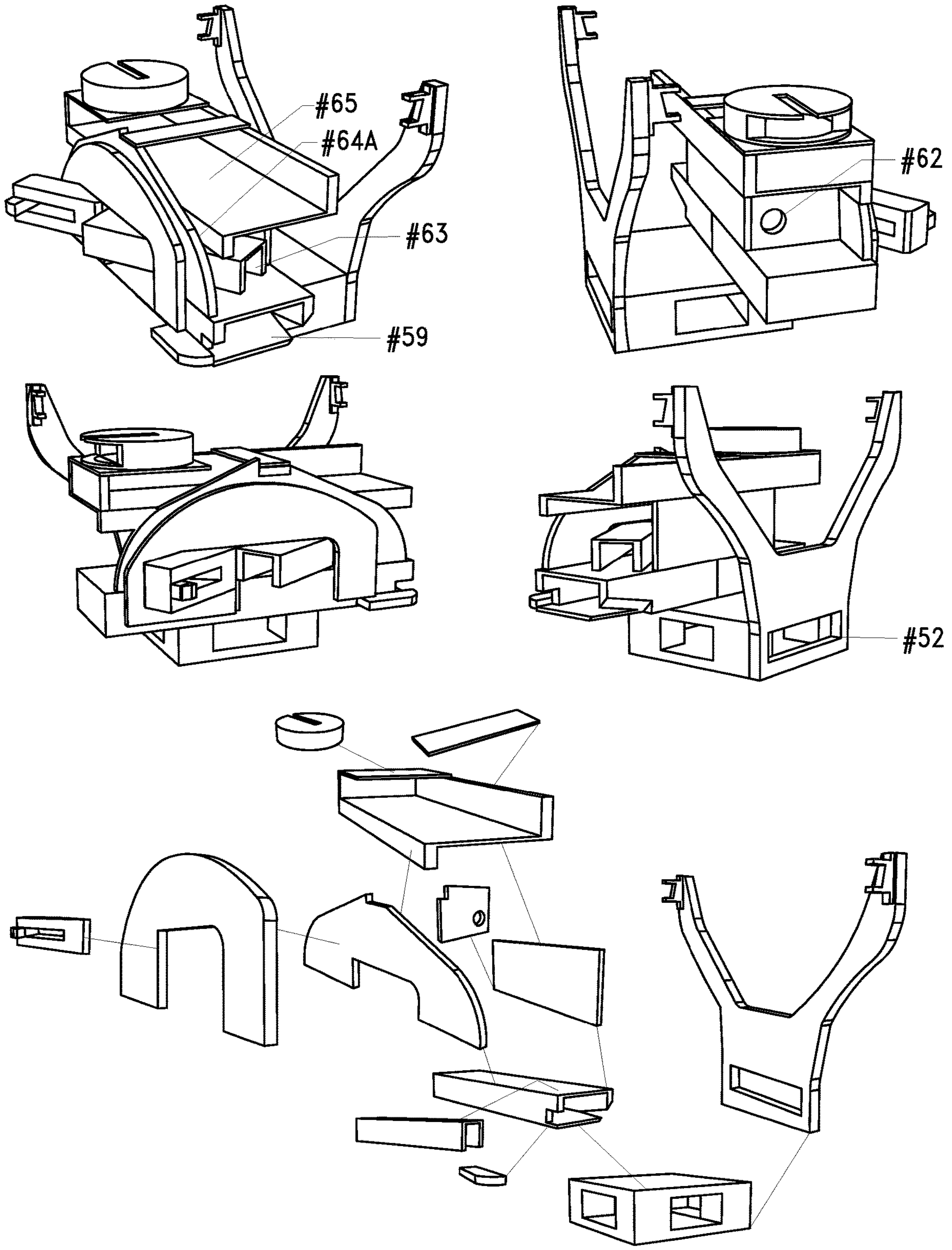
FIG. 3 - TOOLBOX

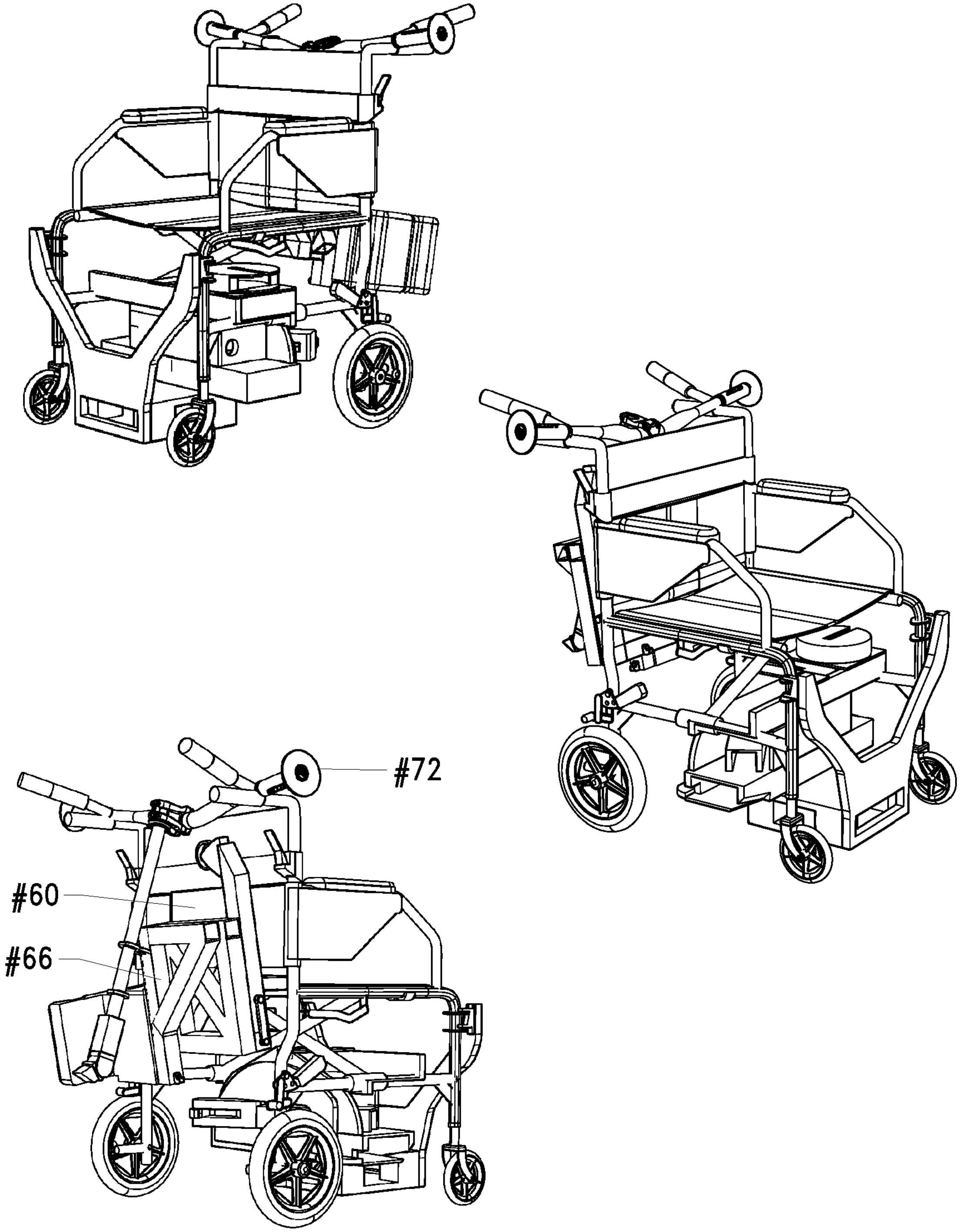
FIG. 4 – TRANSPORT WHEELCHAIR WITH TOOLBOX AND LIFT STOWED

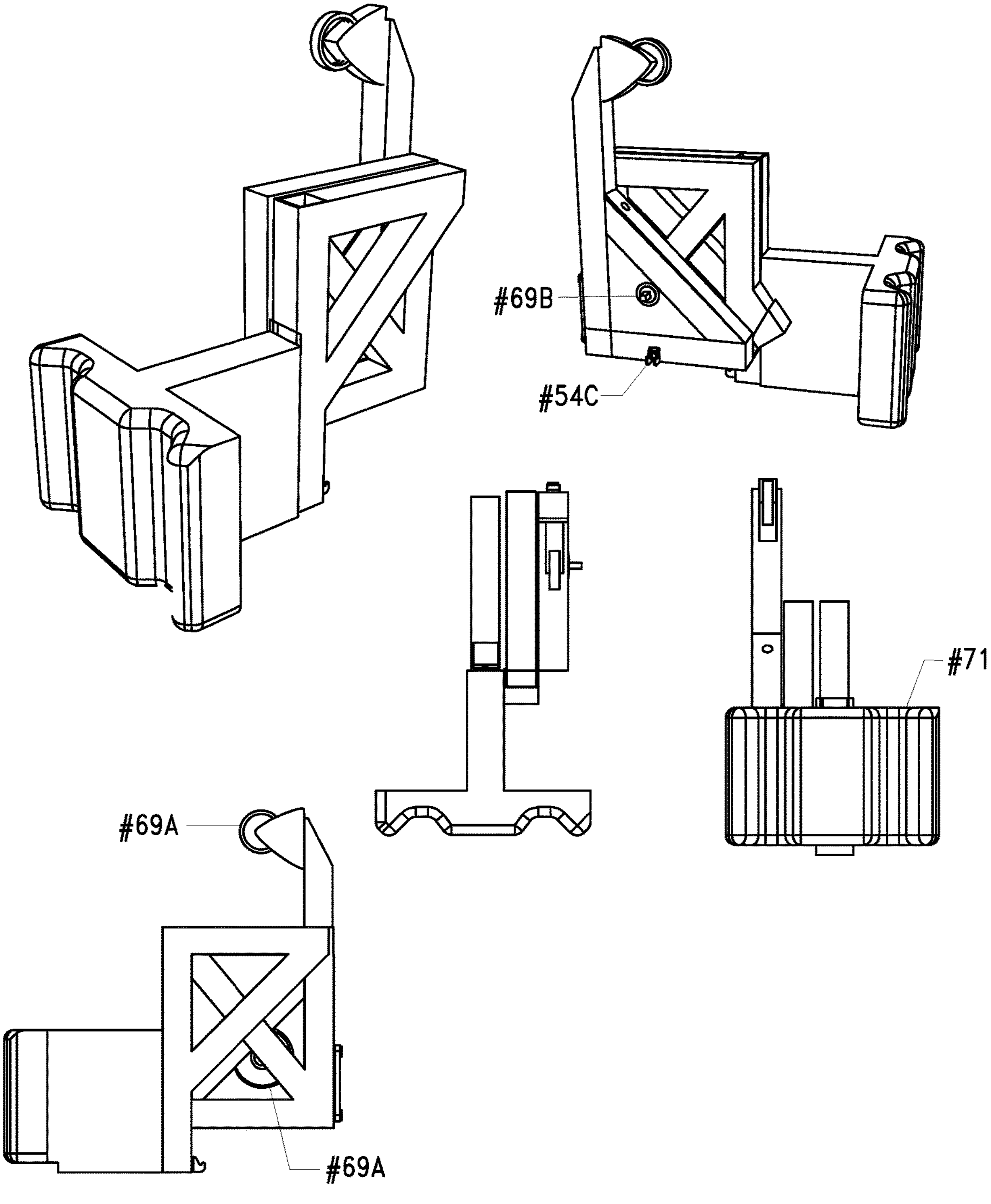
FIG. 5 – FOLDING STRUCTURE FOLDED

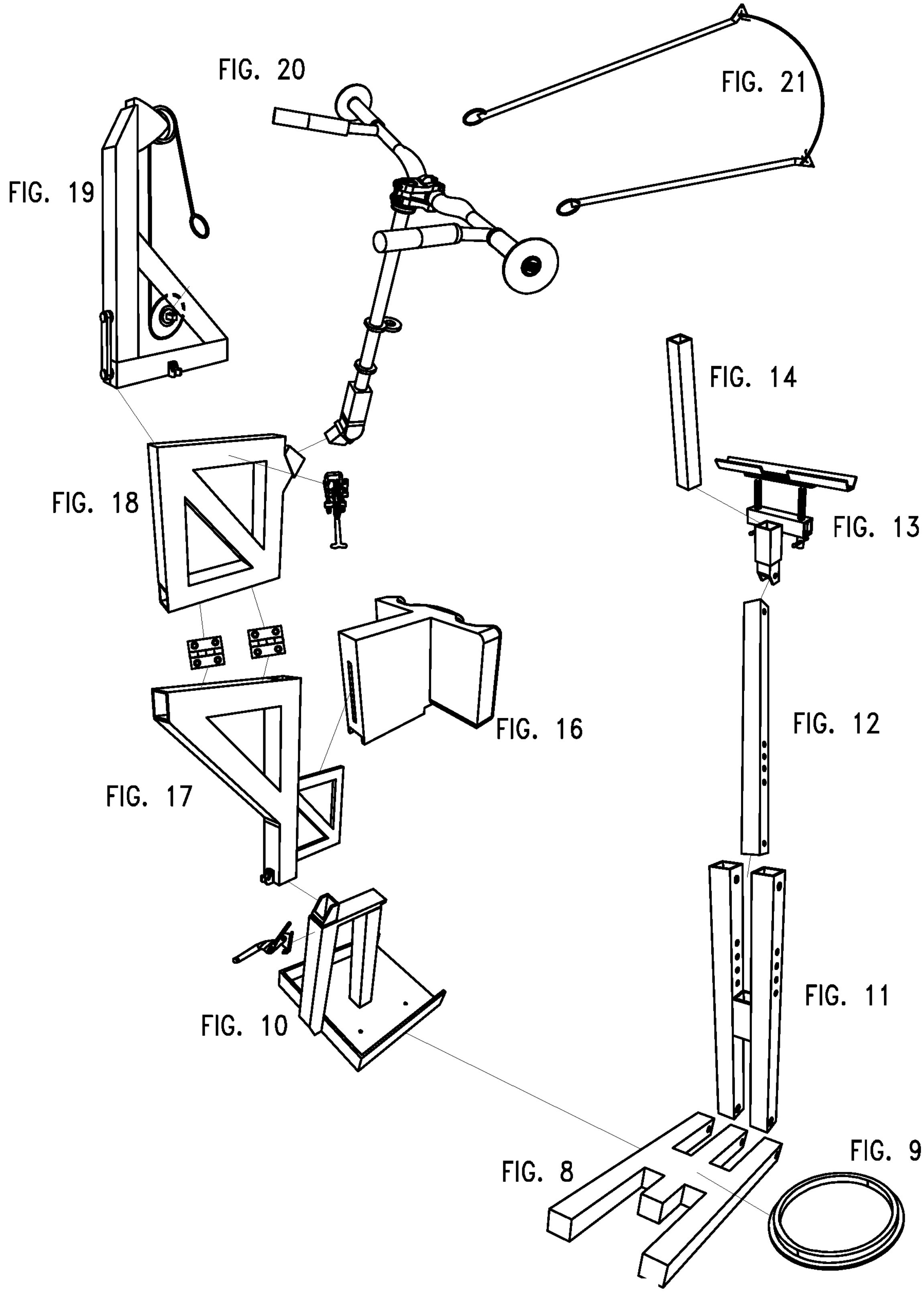
FIG. 6 – PIECES IN EXPANDED VIEW WITH FIGURE NUMBERS

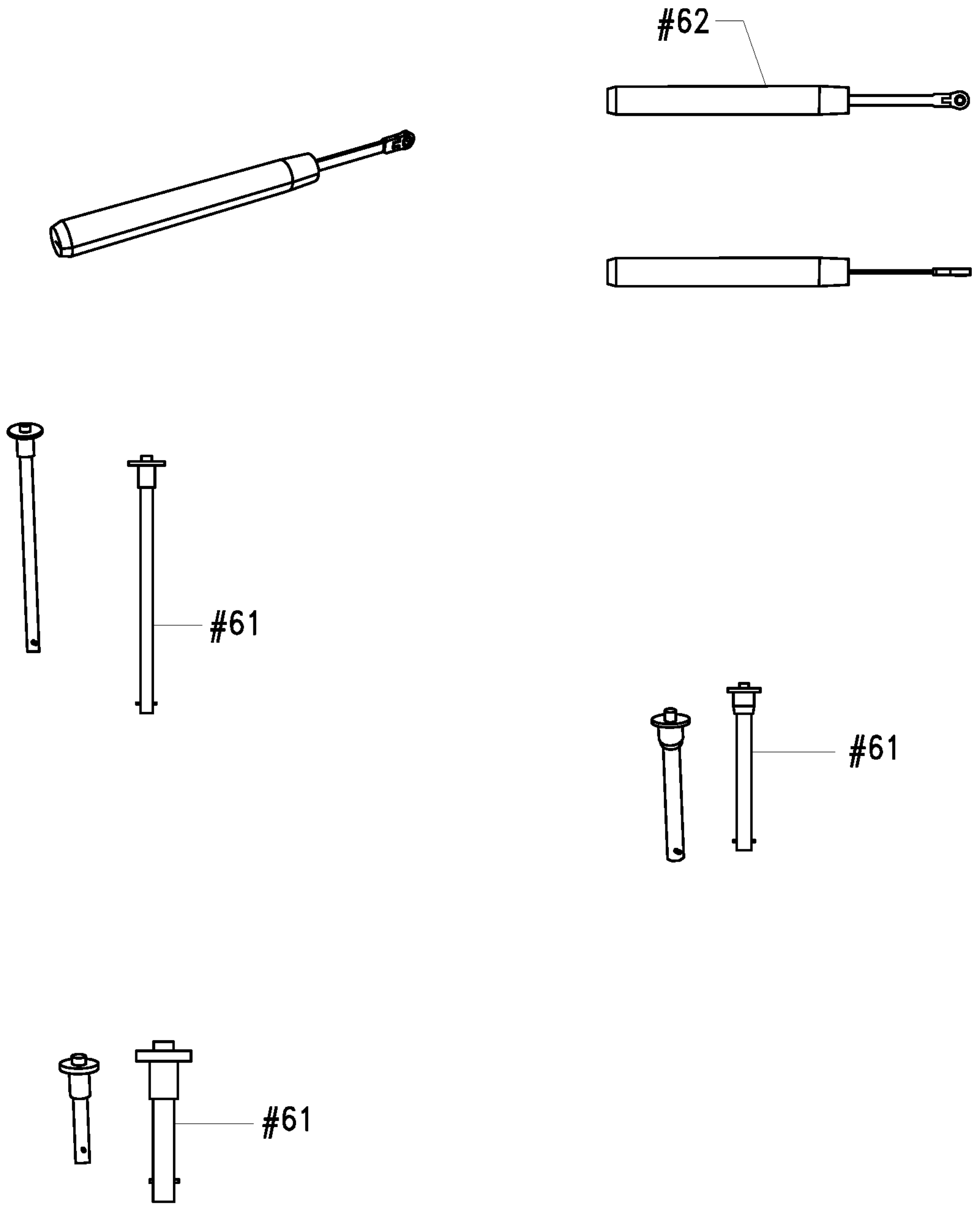
FIG. 7 – RELEASE PINS & FLEXIBLE RATCHET

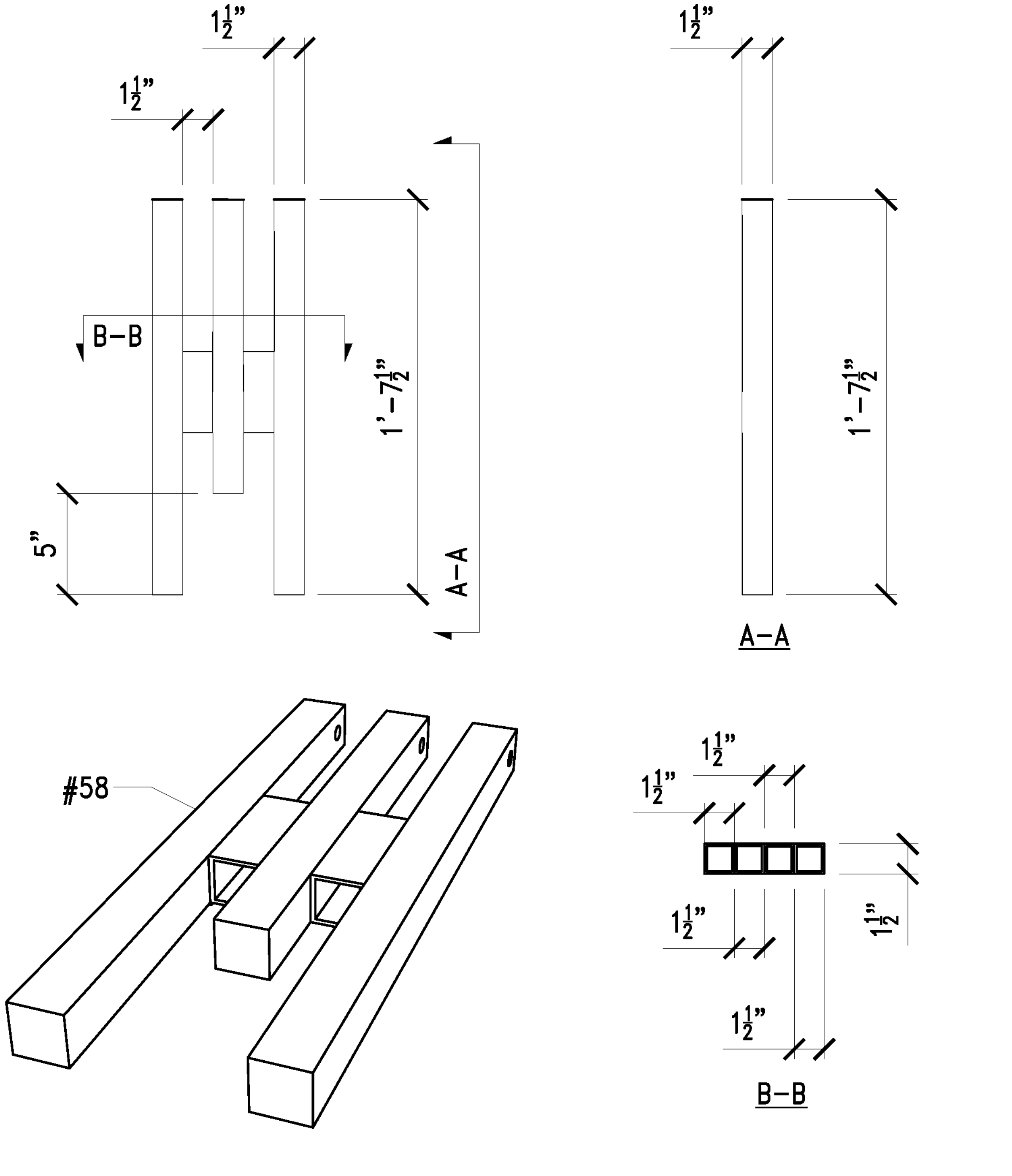
TYPICAL: ALL SQUARE TUBES SHOWN ARE TO BE 1½"x1½"x⅛" ALUMINUM TUBES, GRADE 6061. ASTM B221.
FIG. 8 – E-BASE

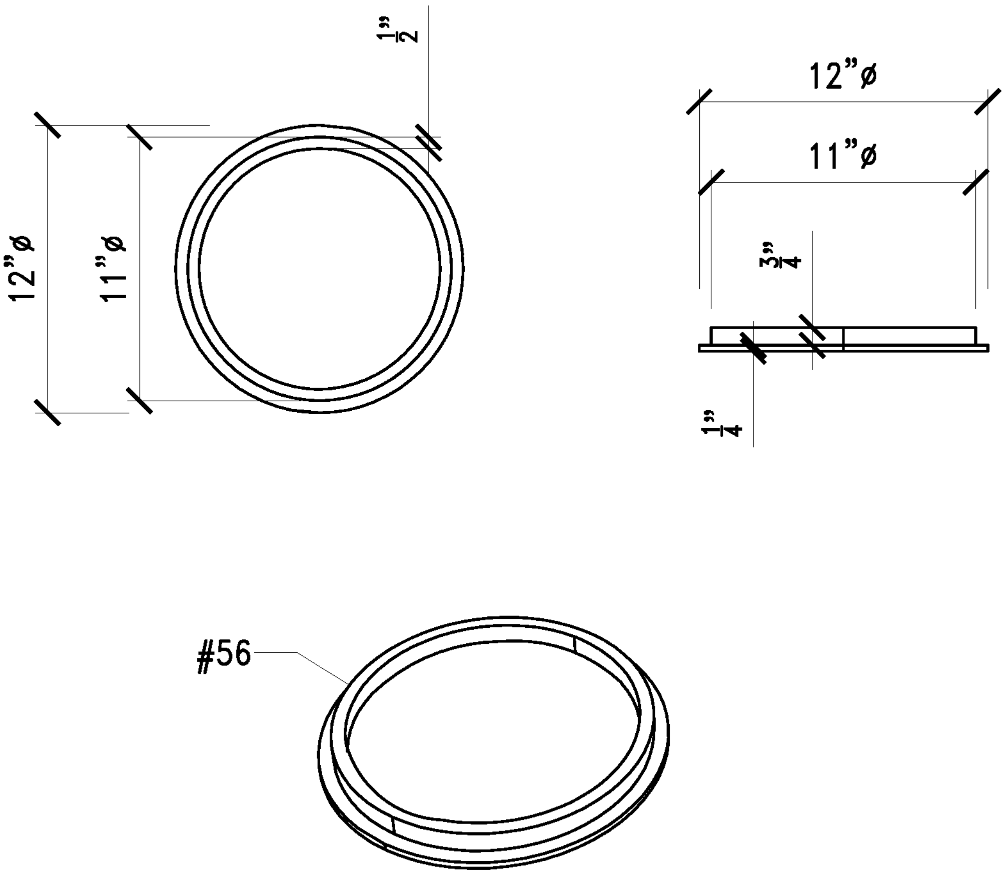
FIG. 9 – NON-BACKDRIVABLE GEAR SYSTEM

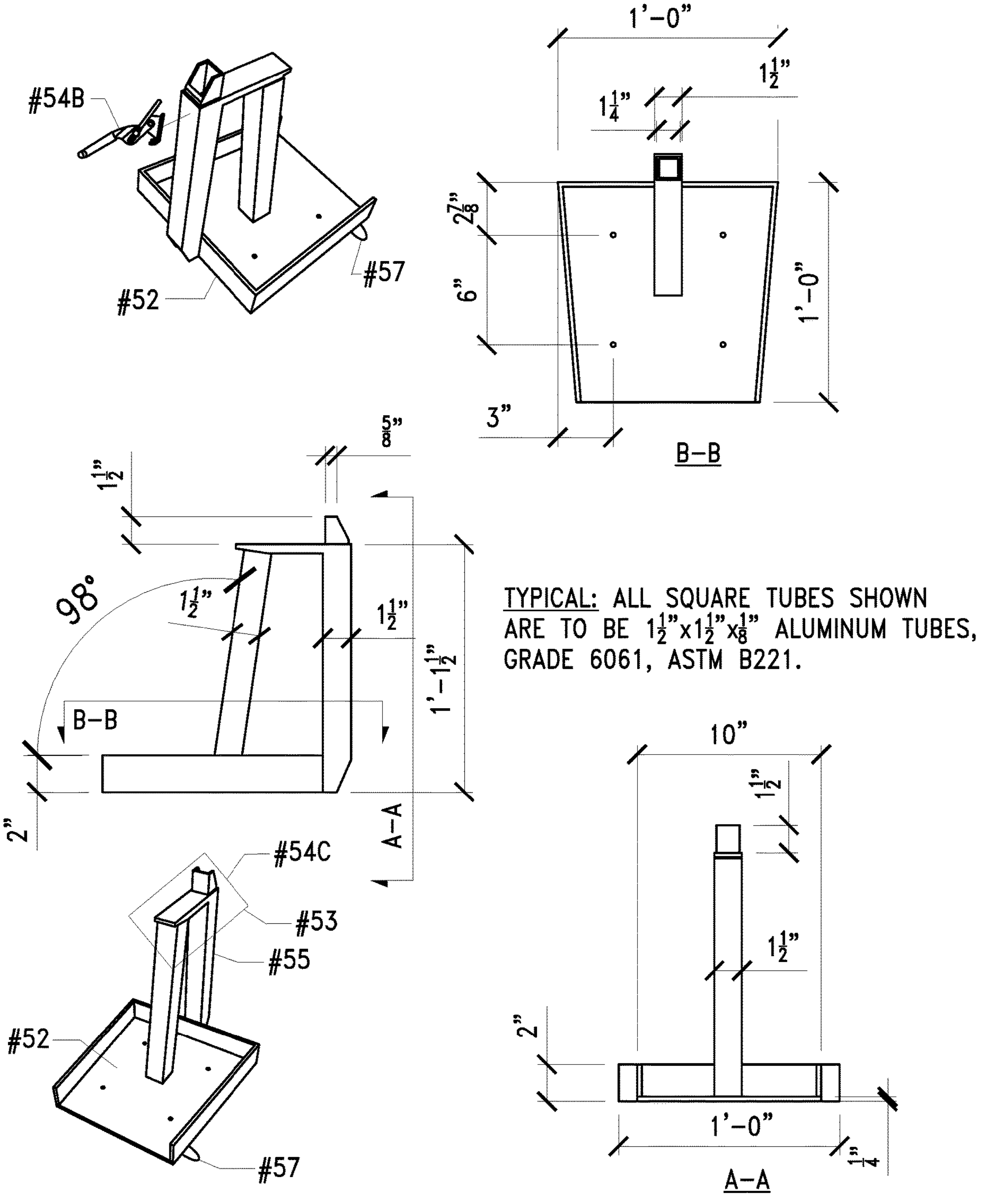
FIG. 10 – FOOTREST/BASE PLATE

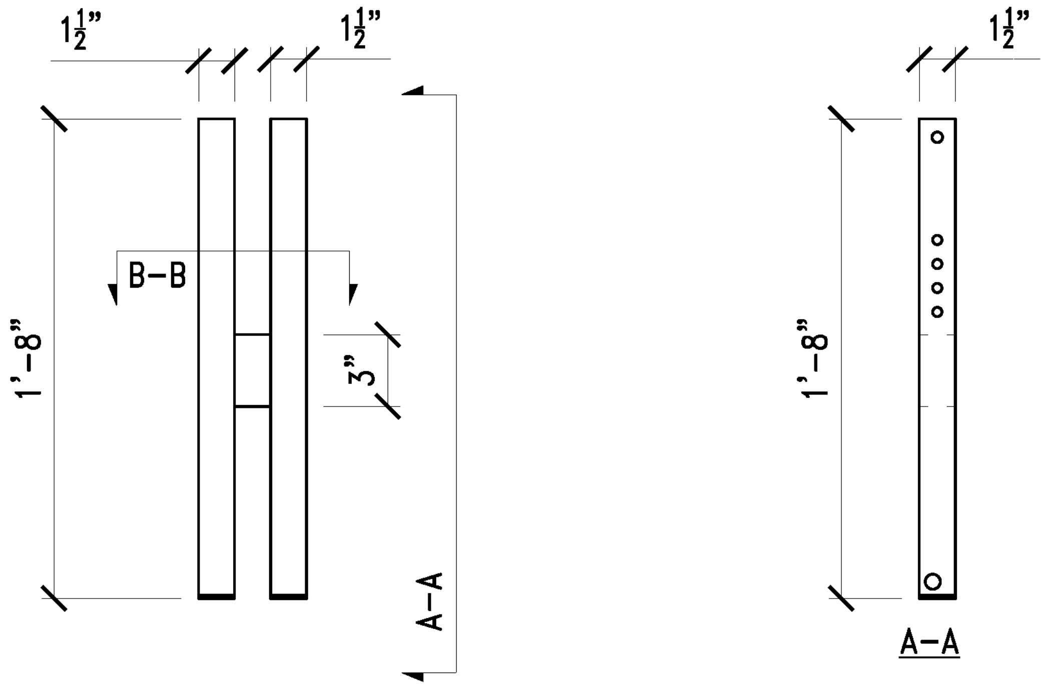
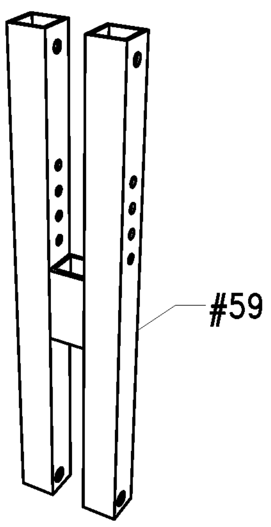
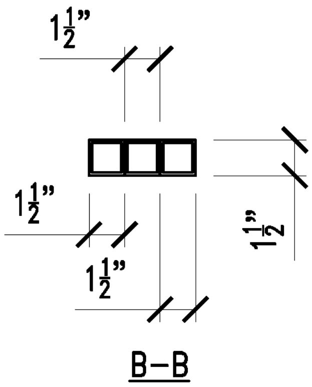
TYPICAL: ALL SQUARE TUBES SHOWN ARE TO BE 1½"x1½"x⅛" ALUMINUM TUBES, GRADE 6061, ASTM B221.
FIG. 11 – H-RISER

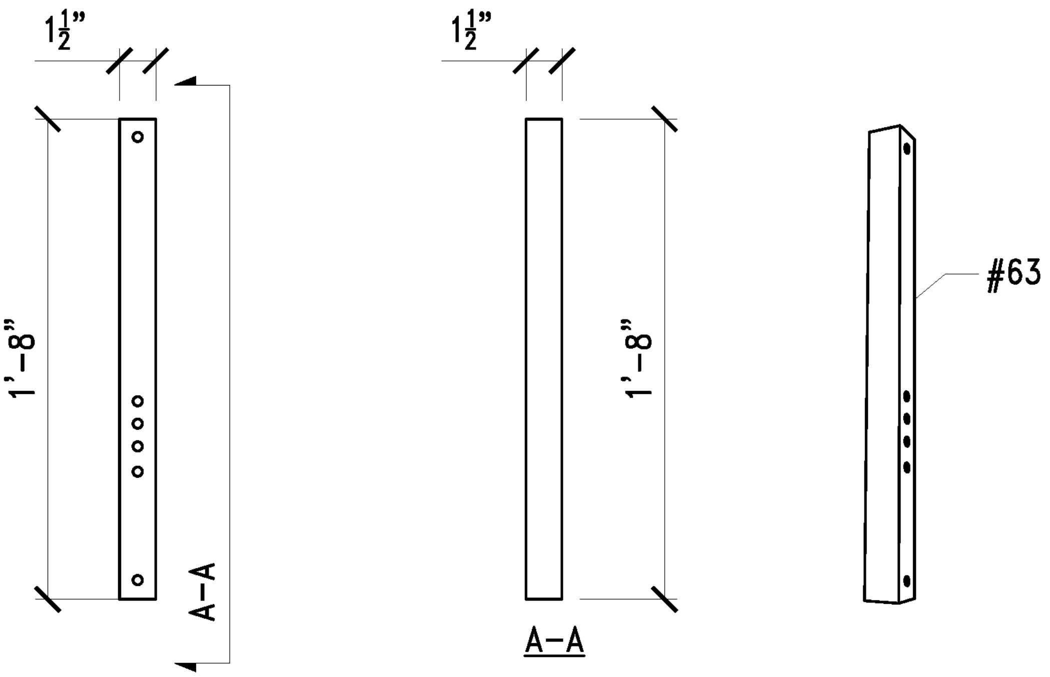
TYPICAL: ALL SQUARE TUBES SHOWN ARE TO BE 1½"x1½"x⅛" ALUMINUM TUBES, GRADE 6061, ASTM B221.
FIG. 12 – PUSHER ROD

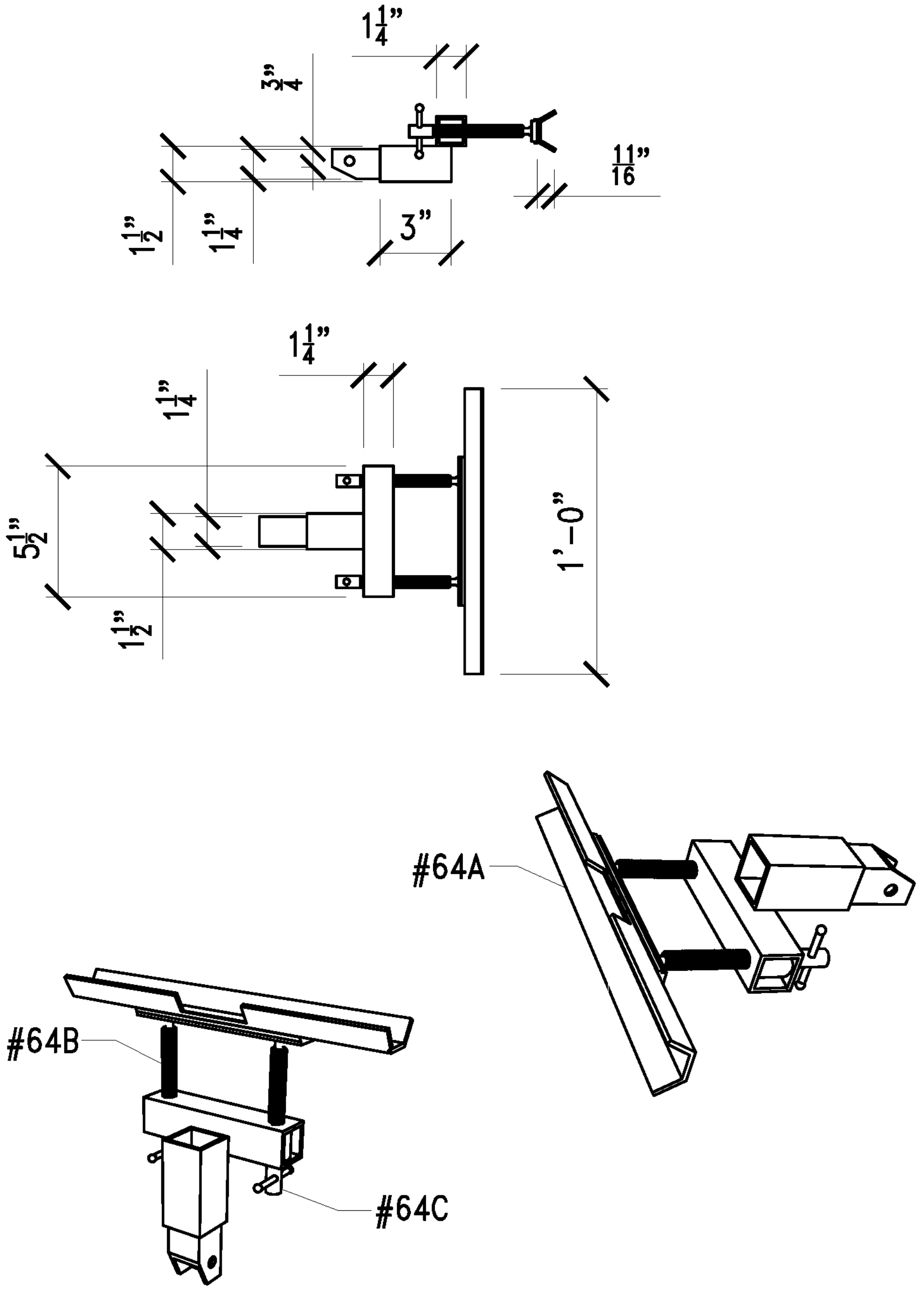
FIG. 13 – GRAB BAR PUSHER

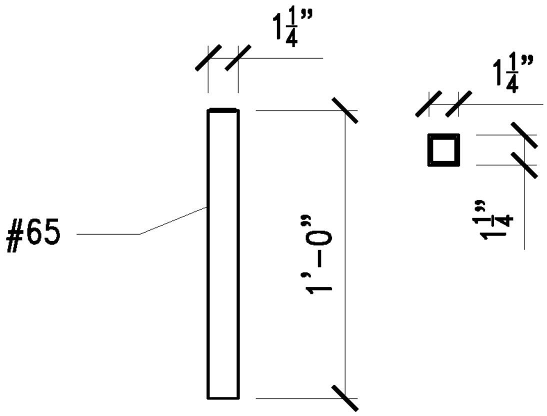
TYPICAL: SQUARE TUBES SHOWN TO BE 1 1/4"x1 1/4"x1/8" ALUMINUM TUBES, GRADE 6061, ASTM B221.
FIG. 14 – STABILIZER BAR

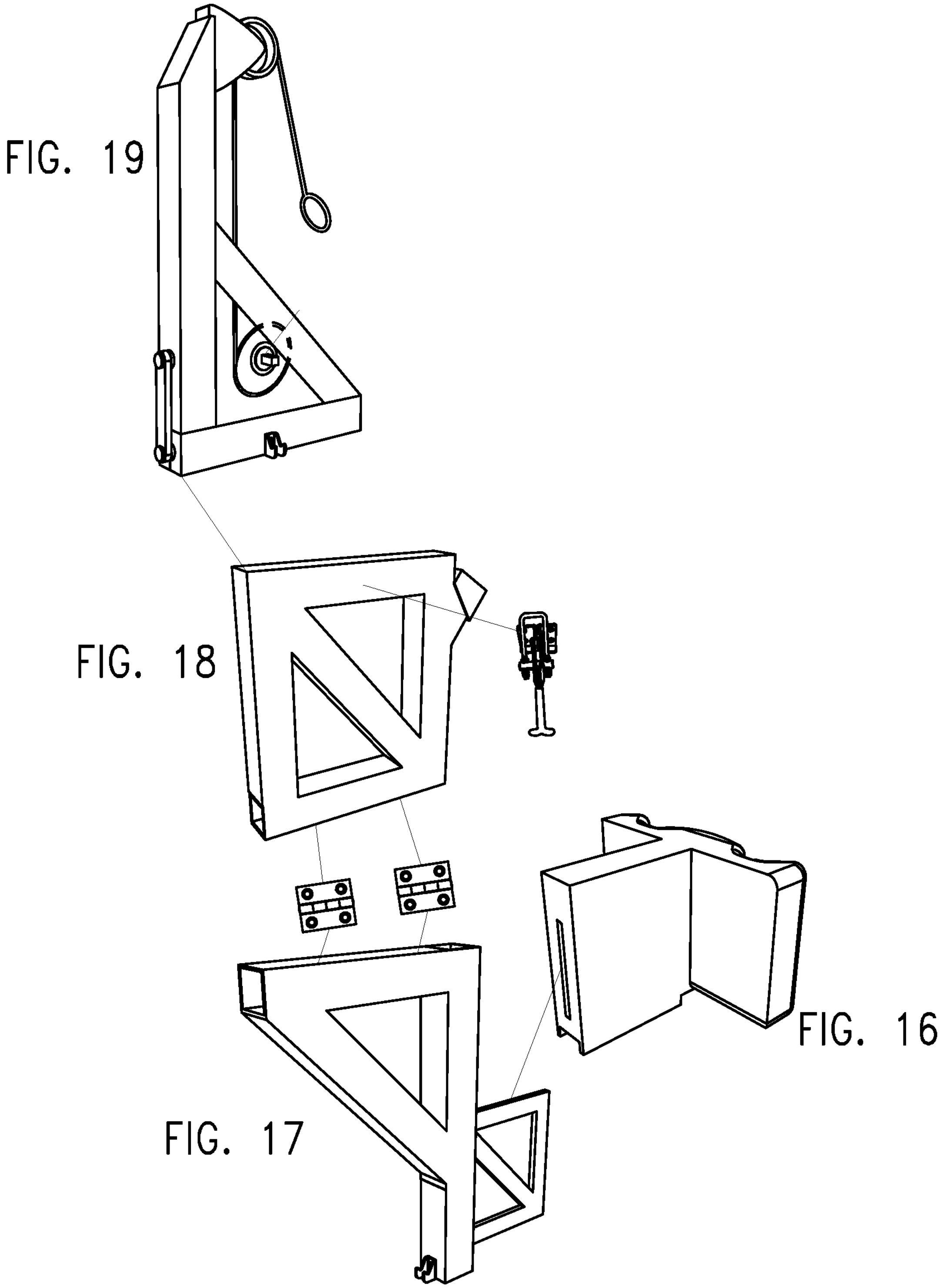
FIG. 15 – FOLDING STRUCTURE EXPANDED

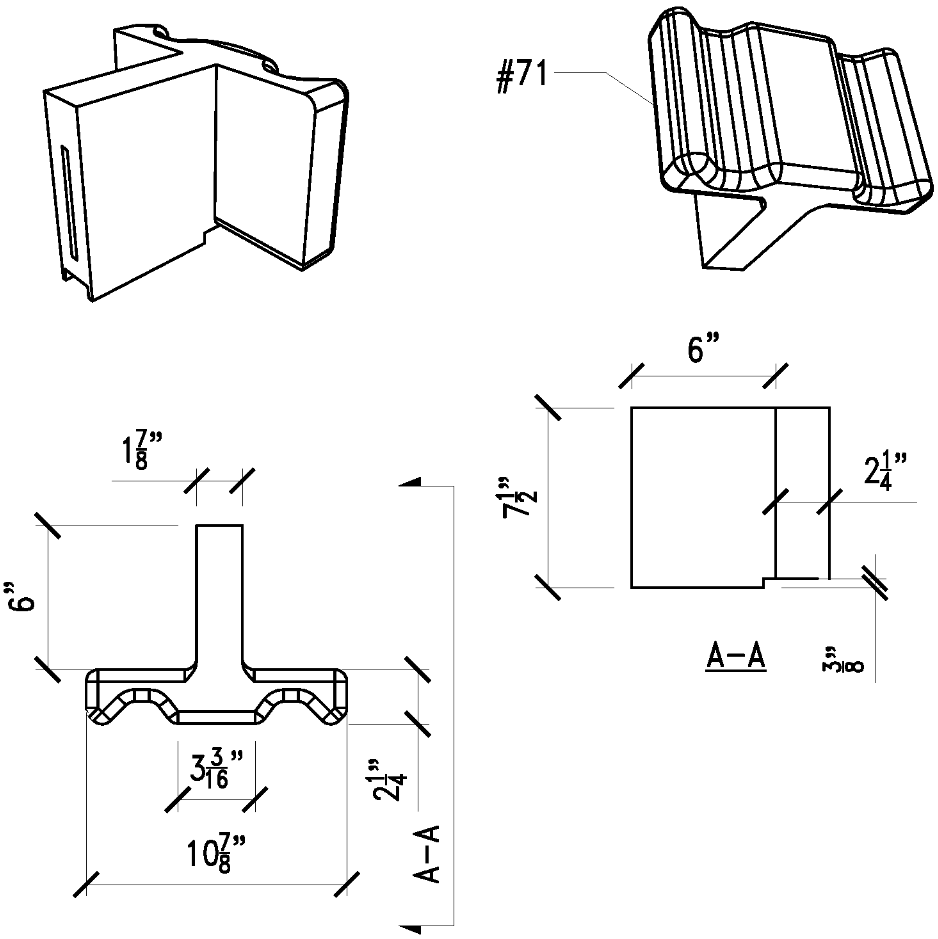
FIG. 16 – FOLDING STRUCTURE KNEE PADS

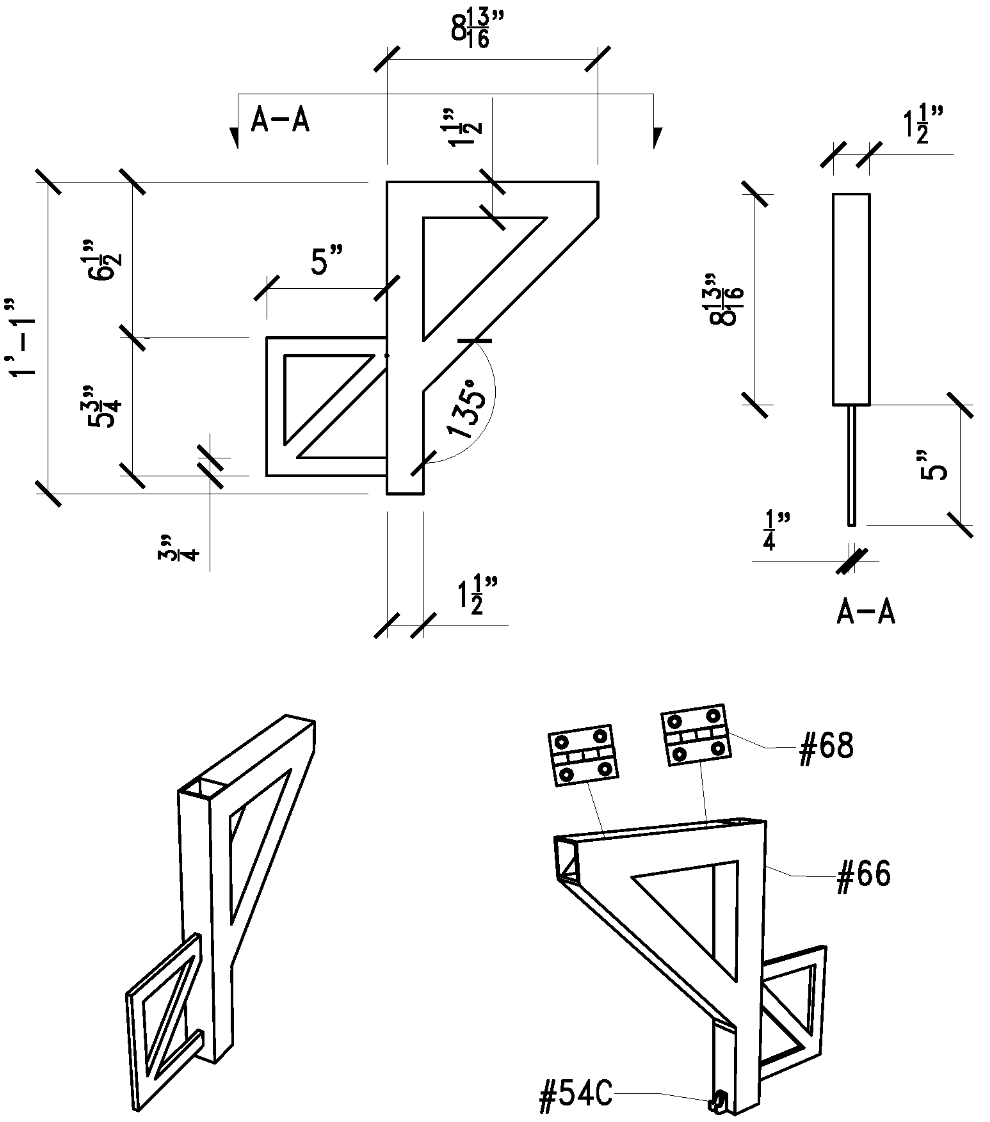
TYPICAL: ALL SQUARE TUBES SHOWN ARE TO BE $1\frac{1}{2}$"x$1\frac{1}{2}$"x$\frac{1}{8}$" ALUMINUM TUBES, GRADE 6061, ASTM B221.
FIG. 17 – BOTTOM OF FOLDING STRUCTURE #66

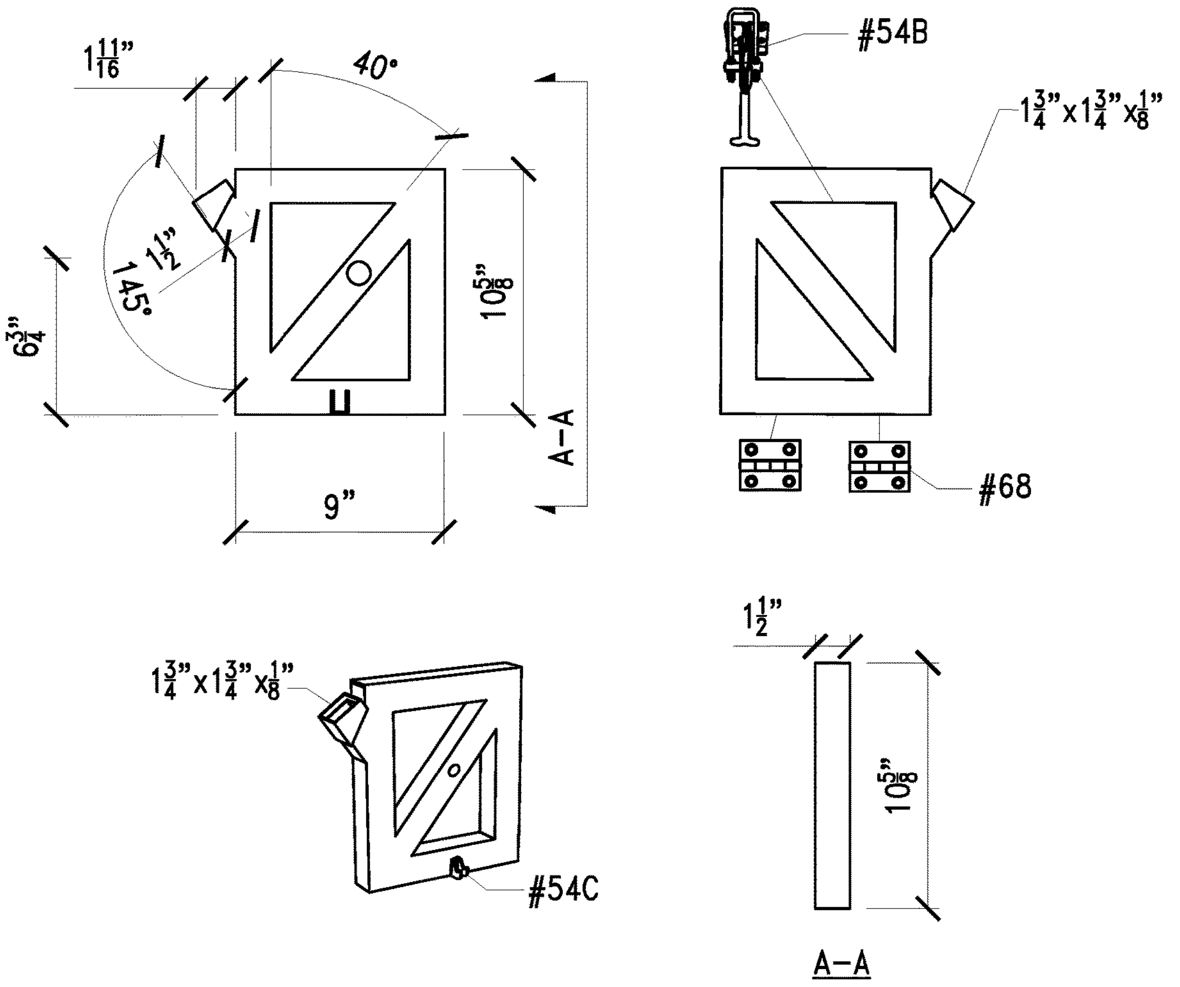
TYPICAL: ALL SQUARE TUBES SHOWN ARE TO BE 1 1/2"x1 1/2"x1/8" ALUMINUM TUBES, GRADE 6061, ASTM B221.
FIG. 18 – MIDDLE SECTION OF FOLDING STRUCTURE.

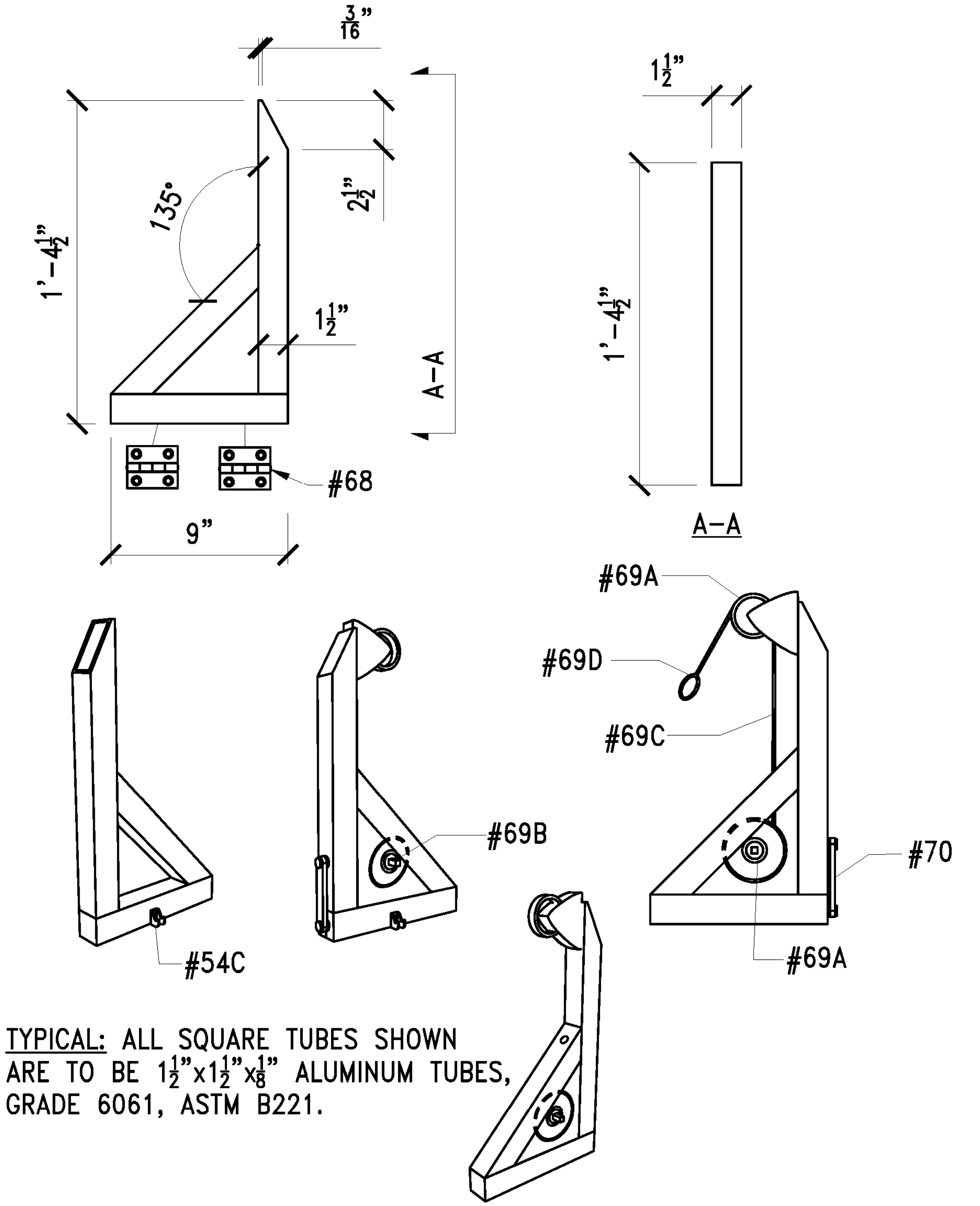
FIG. 19 – TOP SECTION OF FOLDING STRUCTURE

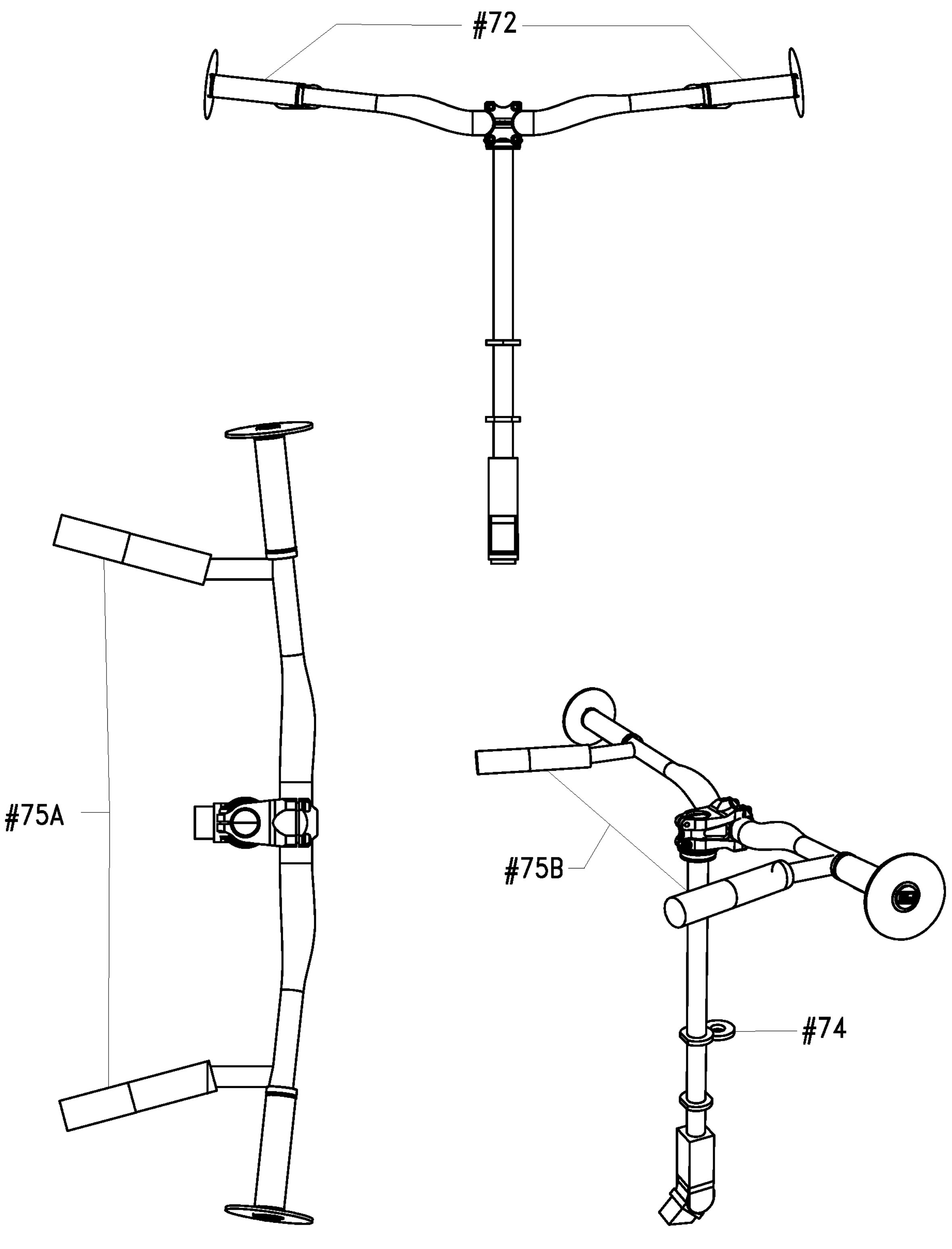
FIG. 20 – HANDLEBARS

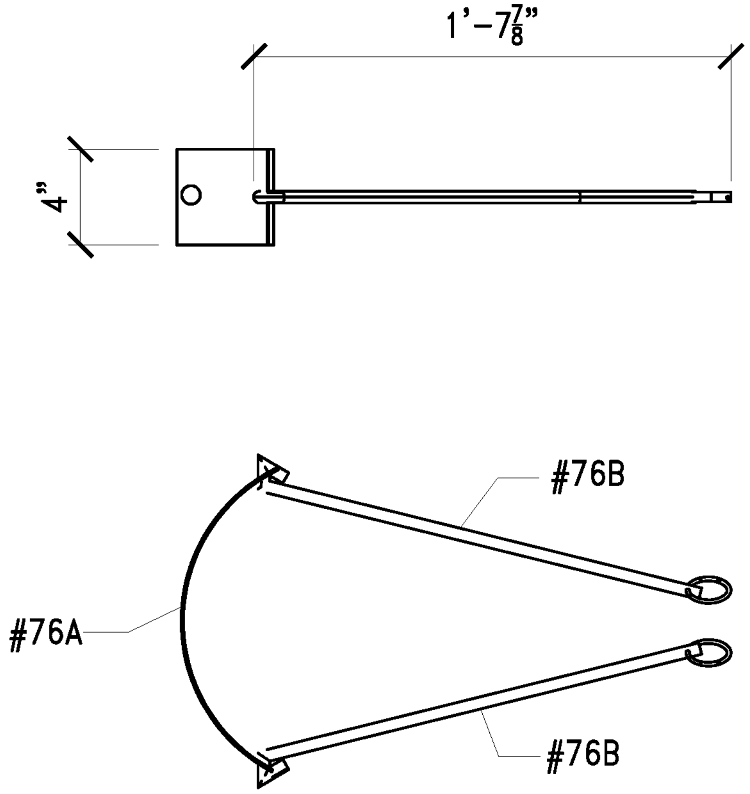
FIG. 21 – SLING

PORTABLE SIT-TO-STAND LIFT STOWED ON A TRANSPORT WHEELCHAIR

Cross-references to Related Applications are located on the Information Disclosure Statement Application This application claims the benefit of provisional patent application Ser. No. 63/454,593, filed 2023 Mar. 24, by the present inventor.

BACKGROUND OF DISCLOSURE

Mobility can be limited when people are disabled, aged, injured, and who use wheelchairs as a necessity. They may need assistance to transfer from a sitting to a standing position. Many assistance devices used today are found in institutions such as hospitals, rehab centers, nursing homes, and assisted living sites. Transferring a person from a wheelchair to a toilet is complex, especially when the person has little to no weight-bearing capabilities.

SUMMARY

Transferring from a wheelchair to a toilet is often accomplished by caregivers, either a professional or a family member, using one of the below-listed methods:

Suppose a person can stand for a short period and needs minimal assistance. In that case, caregivers might use a "gate belt" to assist in transferring the person from a wheelchair to a standing position and then lowering the person onto the toilet. This method is not suitable when the person needing assistance has demonstrated little to no weight-bearing capabilities. At times, caregivers may use a "bear hug" technique to transfer someone from one place to another. This technique involves the caregiver holding and transferring the person to a new location, such as from a wheelchair to a toilet. This technique can put both parties at high risk for further injuries. If supported solely by a professional caregiver or family member, the person with little to no weight-bearing capability is at a higher risk of injury while being transferred. The person transferred could collapse while attempting to lift themselves or sustain a fall while being raised.

The caregiver could sustain severe strain on the shoulders or other muscle injuries while lifting or moving the person or while trying to prevent the person from falling. The forward bending required for many individuals and the lifting and moving actions make the caregiver's spine vulnerable to injuries. Even under ideal lifting conditions, the typical weight of any adult far exceeds the lifting capacity of most caregivers, ninety percent of whom are female. (although not recommended by medical professionals, this technique is often used to aid individuals with limited mobility in their homes or communities.) Manual stand-assist or sit-to-stand devices are another method to transfer a person with little to no weight-bearing capabilities from a wheelchair to a toilet.

The manual sit-to-stand is an apparatus that allows a person with weight-bearing capabilities to move securely and safely between sitting and standing positions. Manual lifts found in institutions are often shared and sometimes unavailable. Moving the person may cause them to feel anxious because there are no security straps with this device.

A hydraulic sit-to-stand operating system using a hand-held crank has disadvantages. When a caregiver performs a manual sit-to-stand transfer, there is a tendency for the person being transferred to experience sudden jolts while being lifted or lowered.

Another transfer method is an electric sit-to-stand device, which requires someone to plug the lift directly into an outlet designated for that voltage. This electric sit-to-stand is not easily transportable.

A recent patent is for a battery-operated sit-to-stand model. One drawback is that the device will not operate with an uncharged battery. A low battery can cause the apparatus to start a transfer, and then, while moving the person, it fails, which can happen while lifting or descending.

Other concerns about the battery are battery life expectancy and the cost of replacement batteries. Also, another drawback associated with the power-standing-frame system is the inability of the caregiver to maneuver the system once the person needing assistance is in an upright position on the device.

Most institutions require a mechanical sit-to-stand device as a two-person-assist for safety and liability concerns. The most current sit-to-stand inventions on the market are bulky, cumbersome, expensive, and typically too heavy to be moved out of a facility.

A sit-to-stand lift system should be user-friendly and portable, operate reliably, and be affordable. For a person who uses a wheelchair and has little to no weight-bearing capability, a portable sit-to-stand for toileting is needed outside their home and in their community.

BRIEF DESCRIPTION OF DRAWINGS

In the drawings, closely related figures have the same number

FIG. 1 shows a picture of a transport wheelchair model for which a custom toolbox was designed and a portable sit-to-stand lift will be stowed.

FIG. 2 displays the toolbox attached to the transport wheelchair and storage compartments of the sit-to-stand lift.

FIG. 3 shows the toolbox expanded, detailing compartments for parts of the sit-to-stand lift and the connection site for the toolbox to the transport wheelchair.

FIG. 4 shows views of the toolbox, the added sit-to-stand lift attachments, and the pocket on the backrest of the transport wheelchair.

FIG. 5 shows the folding structure with a knee pad folded and removed from the back of the transport wheelchair.

FIG. 6 shows each piece of the sit-to-stand lift in expanded views with identifying figure numbers.

FIG. 7 shows the five release pins to be stored in the pocket of the transport wheelchair and the hand-held flexible ratchet to be stored in the toolbox.

FIG. 8 shows an image of the E-base, the bottom of the footrest/base plate, and the starting point for building the sit-to-stand lift.

FIG. 9 shows a diagram of the locking/unlocking gear system sandwiched between the E-base and footrest/base plate.

FIG. 10 shows the footrest/base plate with locking/unlocking levers. On top of the post is the connection site for the folding structure.

FIG. 11 shows the detailed aspect of the H-riser: the larger holes on the bottom of the structure where the E-base is connected and the top of the H-riser where the pusher rod is attached.

FIG. 12 shows the pusher rod in three dimensions and its connection sites for the H-riser and the grab bar pusher.

FIG. 13 shows the details of the grab bar pusher, grab bar pusher threaded rod, grab bar pusher threaded rod handle, and the connection site for the grab bar pusher to the pusher rod, where the smallest pin connects both.

FIG. 14 shows the stabilizer bar that will be inserted into the top of the grab bar pusher behind the grab bar on the wall.

FIG. 15 shows an expanded version of the folding structure, unfolded, including the knee pad on the bottom and the non-backdrivable gear system on the top of the structure.

FIG. 16 shows the details of the knee pad and its connection site to the folding structure.

FIG. 17 shows the bottom of the folding structure, where the knee pad connects, and where a latch hook will connect the folding structure to the post on the footrest/base plate.

FIG. 18 shows in detail the mid-section of the folding structure, including the sleeve for the handlebar extension pole and pieces of the toggle clamp locking mechanism that will be used to secure it to the other parts of the folding structure.

FIG. 19 shows the top section of the folding structure in detail, including where a low-cost, non-backdrivable gear is mounted and where it can be driven forward and reversed simply by using the hand-held flexible ratchet.

FIG. 20 details the handlebar, extensions for stand-assist sling loop straps, and an extension pole connecting the handlebar and the folding structure. A ring on the extension pole for the cargo hook on the end of the cable to connect to.

FIG. 21 shows a version of a stand-assist sling.

DRAWING—REFERENCE NUMERALS

50—transport wheelchair (TW50)
51—toolbox
52—footrest/base plate (base plate 52)
53—cover
54A—toggle clamp locking mechanism (toggle clamp 54A)
54B—toggle clamp locking mechanism, base plate with U-latch pull bar (toggle base plate 54B)
54C—toggle clamp locking mechanism, grip latch plate (grip latch plate 54C)
55—post on footrest/base plate (post on base plate 55)
56—locking/unlocking (gear system 56)
57—locking/unlocking gear system levers (levers 57)
58—E-base
59—H-riser
60—pocket for release pins
61—release pins
62—hand-held flexible ratchet (ratchet 62)
63—pusher rod
64A—grab bar pusher
64B—grab bar pusher, threaded rod
64C—grab bar pusher, threaded rod, handle
65—stabilizer bar
66—folding structure
67—grab bar on the wall
68—hinges
69A—non-backdrivable gear system
69B—extended knob on non-backdrivable gear system
69C—cable
69D—cargo hook on the end of the cable
70—stabilizer belt
71—knee pads
72—handlebars
73—handlebar extension pole
74—ring on the extension pole
75A—extension for stand-assist sling loop straps
75B—loop strap connection site
76A—stand-assist sling (sling 76A)
76B—stand-assist sling loop straps

DETAILED DESCRIPTION

A transport wheelchair is listed on the Disclosure Statement, U.S. Pat. D624,4595, hereafter referred to as (TW50) as detailed in FIG. 1. The TW50 is portable and requires a caregiver for mobility assistance. TW50 is foldable and lightweight, weighing 23.5 pounds, making it easy to pack into a vehicle. TW50 design is compatible with my designed removable toolbox, as shown in FIG. 2, which can be easily attached. My sit-to-stand lift can be conveniently stowed on TW50. All the necessary components for this sit-to-stand lift weigh only 16 pounds and does not add excessive weight to TW50, as described in the present disclosure in FIG. 3 and FIG. 4. When a handicap feature is available, a wheelchair user can access a toilet using my sit-to-stand lift.

The handicap feature used in this invention is a load-bearing grab bar, as listed on the Disclosure Statement, which is used in public restrooms and household bathrooms to aid disabled people. A principal design trait is that the sit-to-stand lift uses the grab bar available in public toilets and household bathrooms to support the load of the sit-to-stand lift and the user. A grab bar precludes the need for a broad and heavy base of a sit-to-stand. A handlebar (72), a stand-assist sling (76A) listed on the Disclosure Statement and hereafter referred to as (sling 76A), and a folding structure (66) with knee pad (71) are stowed on the back of TW50 as well as release pins (61) as listed on the Disclosure Statement, which is stored in a pocket (60) on the back of TW50, as shown in FIG. 4.

On the front and under the seat of TW50 is a carrier box made of wood. This carrier is referred to as toolbox (51). FIG. 3 shows the toolbox in an expanded view. Toolbox 51 is removable from TW50 and can be transported in a vehicle. It is attachable to TW50 when needed to carry some sit-to-stand lift pieces that require assembly. It has designated spaces to store additional items needed to build my portable sit-to-stand lift. Using the existing TW50 footrest connecting pins, toolbox 51 connects to TW50 at the site where the foot tray or footrest is usually attached, as demonstrated in FIG. 2.

On the left or right-hand side of toolbox 51 are the following disassembled smaller pieces of this sit-to-stand lift: a H-riser (59), illustrated in FIG. 11, a pusher rod (63), illustrated in FIG. 12, a grab bar pusher (64A), illustrated in FIG. 13, a stabilizer bar (65), illustrated in FIG. 14, and a hand-held flexible ratchet, illustrated in FIG. 7, listed on the Disclosure Statement and hereafter referred to as (ratchet 62). After you have stowed the necessary pieces of the portable sit-to-stand lift on TW50, as viewed in FIGS. 3-4, and the pieces in an expanded view, as in FIG. 6 and FIG. 7, TW50 is ready to transport the user.

A footrest/base plate (52) consists of the following pieces detailed in more extensive views in FIGS. 8-10, from the ground up: E-base (58), locking gear system (56), hereafter referred to as (gear system 56), and footrest/base plate 52. E-base 58 has two purposes: 1. it enables the entire footrest/base plate 52 to be stored in toolbox 51 and 2. the starting point for assembling the sit-to-stand lift, as shown in FIG. 6.

Connected to the top of E-base 58 is gear system 56. This piece also has two functions: 1. it allows the operator to convert footrest/base plate 52 into the sit-to-stand lift base plate 52 by moving one of the two simultaneously locking/unlocking gear levers, referred to as (levers 57) on either side of the footrest/base plate 52: 2. levers 57 hold the gear system 56 in place when needed and allowing for footrest/base plate 52 to rotate 180 degrees when it is needed to convert into the base plate 52 of the sit-to-stand lift. Gear system 56 is sandwiched between E-base 58 and footrest/base plate 52. Footrest/base plate 52, as shown in FIG. 10, has two purposes: 1. to be a resting place for the feet of the person sitting in the wheelchair, and 2. to be the base of the sit-to-stand lift. Footrest/base plate 52 is aluminum. On the footrest/base plate, 52 is a post 55. On post of footrest/base plate, 55 is a toggle base plate clamp 54B. A toggle clamp locking mechanism is listed in the Disclosure Statement and hereafter referred to as (toggle clamp 54A), consists of two pieces: a toggle clamp base plate with a U-latch pull bar referred to as (toggle base plate 54B) and a toggle clamp grip latch plate referred to as (grip latch plate 54C), under a rubber rectangle block, referred to as cover (53), located over the post on footrest/base plate 55 as shown in FIG. 10 is a grip latch plate 54C. Secure these two pieces joining a toggle clamp 54A device.

Cover 53 has two safeguards: 1. it protects the knees of the person sitting in TW50 from banging their knees on an aluminum post while being transported, and 2. it covers the extending notch at the top of the post on the footrest/base plate 55, which could be a hazard to TW50 user.

For toileting, position the person on TW50 in a handicap bathroom facing the wall with a grab bar on the wall (67) next to the toilet. TW50 and the toilet will face two different directions, 90 degrees to each other. Start building the portable sit-to-stand lift by retrieving and assembling the parts needed from TW50. FIG. 6 shows a diagram of all the sit-to-stand pieces that will eventually be removed from TW50 and the assembling of the sit-to-stand lift.

Slide out footrest/base plate 52 from the designated space in front of toolbox 51; this will be used as the base for my portable sit-to-stand lift, hereafter referred to as (base plate 52).

The operator's hand will unlock gear system 56 by moving one of two levers 57 on either side of base plate 52. Rotate base plate 52, 180 degrees. Release lever 57 to lock base plate 52 in place. Place base plate 52 on the floor in front of the person sitting on TW50, with E-base 58 extensions touching the wall in front of the toilet, under grab bar on the wall 67.

Remove H-Riser 59 from toolbox 51. Place H-riser 59 vertically, interweaving larger mating holes on the bottom of the legs with E-base 58. Ensure the H-riser legs align with E-base extensions and that both pieces are flush with the wall under the grab bar.

FIG. 7 details five release pins 61 (two large, two mediums, and one small) stored in the backrest pocket of TW50. Connect and secure E-base 58 and H-Riser 59 by inserting two medium-release pins on either side of E-base 58 closest to the floor. The button on top of release pin 61 must be depressed for the pin to enter its mating hole and released for it to secure E-base and H-riser in place.

Remove pusher rod 63 and grab bar pusher 64A from toolbox 51. Connect the two pieces by inserting the square-shaped bottom of grab bar pusher 64A into the top of pusher rod 63, ensuring the mating holes are correctly aligned. FIG. 6 shows the continuous building and stabilization of the sit-to-stand lift. Secure the mating holes of grab bar pusher 64A and pusher rod 63 with the smallest release pin 61. Having the smallest release pin 61 closest to the wall, place the bottom of pusher rod 63 between the two sides of H-riser 59 and insert the remaining largest release pins 61 in the mating holes of H-riser 59 and pusher rod 63. Place grab bar pusher 64A directly under grab bar on the wall 67. The square hole at the top of the grab bar pusher 64A should be behind the grab bar on the wall 67. Retrieve stabilizer bar 65 from toolbox 51. Place it behind grab bar on the wall 67 and insert it into the top of grab bar pusher 64A. Tighten grab bar pusher 64A to grab bar on the wall 67 by turning grab bar pusher threaded rod handle 64C, as shown in FIG. 13.

Unlock toggle clamp 54A by the joining pieces, toggle base plate 54B on the post on the footrest/base plate, and the grip latch plate 54C on the bottom of cover 53. Remove cover 53 from post on base plate 55. After removal, the connection site for the entire folding structure 66 becomes visible. Remove folding structure 66 with attached knee pad 71 from the back of TW50, as viewed in FIG. 4 and FIG. 5, as removed from TW50. Folding structure 66 includes, as shown in FIG. 15, a knee pad, and behind the knee pad, a grip latch plate 54C, as illustrated in FIG. 17, and four hinges (68). Including located on the top section of the folding structure 66 is shown in FIGS. 17-19 is a cable (69C) cargo hook (69D), stabilizer belt (70), and two toggle clamps 54A. Also, a non-backdrivable gear system, also known as a tire winch carrier hoist, was used in this invention. Listed on the Disclosure Statement as a vehicle tire carrier, and hereafter referred to as non-backdrivable gear 69A. On the non-backdrivable gear system, 69A is an extended knob (69B). Unfold both ends of the folding structure 66 to extend the three folding pieces into one long strip, as shown in the expanded view in FIG. 15. Secure folding structure 66 by fastening the two toggle clamps 54A on either side of folding structure 66. Arrange folding structure 66, now expanded and secured, with knee pad facing away from grab bar on the wall 67 and closest to the floor. Place the bottom of folding structure 66 over post on base plate 55, as viewed in FIG. 6. Ensure grip latch plate 54C on the bottom of folding structure 66 is easily accessible to toggle base plate 54B on post on base plate 55.

Secure folding structure 66 and base plate 52 by connecting both pieces of toggle clamp 54A. To temporarily secure folding structure 66 to stabilizer bar 65, fasten stabilizer belt 70, located on the top section of folding structure 66, around the stabilizer bar. The non-backdrivable gear 69A is mounted on the top section of folding structure 66, expanded in FIG. 19. Remove ratchet 62 from toolbox 51, and place it on the extended knob on non-backdrivable gear (69B). Turn ratchet 62 counterclockwise to release cable 69C from non-backdrivable gear 69A fully. Remove handlebars 72 from the back of TW50 as shown in place in FIG. 4. Handlebars have two extensions for stand-assist sling loop straps 75A, a handlebar extension pole 73, and a ring (74) on the extension pole; these figures are shown in FIG. 20. The ring on extension pole 74 is where the cargo hook 69D on cable (69C) from non-backdrivable gear 69A connects. Face ring on extension pole 74 toward the ceiling before inserting the bottom of handlebar extension pole 73 into the square sleeve on the middle section of folding structure 66, as the assembly of this sit-to-stand is shown in FIG. 6.

Connect cargo hook 69D to ring 74 on handlebar extension pole 73. Remove sling 76A from TW50 and secure sling 76A to the person sitting in TW50. A sling couples the person sitting in the TW50 to the sit-to-stand lift. To properly secure sling 76A onto a person seated in a wheelchair TW50.

The operator should wrap sling 76A around the user's back, under their arms, at the mid-section of the body, above the hips, and below the chest, and fasten the stand-assist sling 76A in front of the person to ensure it is securely in place. To position someone sitting in TW50 onto the sit-to-stand lift, follow these steps: Place the feet of the person sitting in TW50 on base plate 52 and ensure their toes are facing forward. Place their hands on handlebars 72 while resting their knees on knee pad 71. Insert stand-assist sling loop straps 76B into the designated area on the extensions for stand-assist sling loop straps 75A, as shown in detail in FIGS. 20-21, and in full view, as shown in FIG. 6. This process will provide a safe transfer from TW50 onto the toilet. On extended knob on non-backdrivable gear 69B, located on non-backdrivable gear 69A, place ratchet 62 and turn clockwise to retract cable 69C. The wheelchair user who was previously seated in TW50 has now stood up. Move TW50 away from the sit-to-stand lift. Release stabilizer belt 70 that secured folding structure 66 to stabilizer bar 65. Unlock gear system 56 by moving one of the two levers 57 on either side of base plate 52 using the operator's foot. Rotate base plate 52 and the standing person 45 degrees so that the back of the user's legs touch the front of the toilet seat. To ensure added stability, the operator may place one hand on the person's lower back and the other on the folding structure 66. Release lever 57 to lock base plate 52 in place. Place ratchet 62 on extended knob on non-backdrivable gear 69B, located on non-backdrivable gear 69A, and turn counterclockwise to lower the person onto the toilet.

To remove the person from the toilet and return them seated on TW50, complete the remaining stages of this invention in reverse order, including disassembling and storing the sit-to-stand lift on TW50.

Operation Details

My portable sit-to-stand left enables people using transport wheelchairs to use handicap-accessible bathrooms equipped with grab bars to be toileted.

The components of the portable sit-to-stand lift are stowed on TW50, as shown in FIGS. 3-4, and are quick and easy to assemble. To begin utilizing the portable sit-to-stand lift, position the person on TW50 in a handicap-accessible bathroom facing the wall with a grab bar on wall 67, next to the toilet. TW50 and the toilet will face two different directions, 90 degrees to each other. Start building the portable sit-to-stand lift by retrieving and assembling the parts needed from TW50, as illustrated in FIGS. 3-4. Following the diagram in FIG. 6, take the following steps to build this portable sit-to-stand lift. Slide out footrest/base plate 52, as in FIG. 3, from the front of toolbox 51. Use the operator's hand to unlock gear system 56 by moving one of two levers 57 on either side of footrest/base plate 52, as shown in FIG. 10. Rotate footrest/base plate 52, 180 degrees. Lock the footrest/base plate 52 in place by releasing lever 57. Footrest/baseplate 52 is now base plate 52 of the portable sit-to-stand lift. Place the base plate 52 on the floor in front of the person sitting on TW50, with E-base 58 extensions flush with the wall, under grab bar on the wall 67, close to the front of the toilet. Remove H-Riser 59, shown in detail in FIG. 11, from toolbox 51. Place H-riser 59 vertically, interweaving larger mating holes on the bottom of the legs with E-base 58. Ensure H-riser legs are in line with E-base extensions and flush against wall under grab bar on the wall 67.

Remove five release pins 6, as described in FIG. 7, from pocket 60 on TW50 as the location is shown in FIG. 4. Insert two medium-release pins 61 on either side of the E-base 58 closest to the floor by depressing the top of the pins. Release the top of the pins to secure the E-base 59 and H-riser 59 together. Remove the following two pieces from toolbox 51: pusher rod 63, shown in detail in FIG. 12, and grab bar pusher 64A, shown in detail in FIG. 13. Connect the two pieces by inserting the square-shaped bottom of grab bar pusher 64A into the top of pusher rod 63. Secure the mating holes of grab bar pusher 64A and the pusher rod 63 with the smallest release pin 61. With the smallest release pin 61 closest to the wall, place the bottom of pusher rod 63 between the two sides of H-riser 59 and insert the remaining release pins 61 in the mating holes of H-riser 59 and pusher rod 63. Place grab bar pusher 64A directly under grab bar on the wall 67. Remove stabilizer bar 65, as shown in detail in FIG. 14, from toolbox 51, place it behind grab bar on the wall 67, and insert it into the top of grab bar pusher 64A. Tighten grab bar pusher 64A to the grab bar on wall 67 by turning clockwise the grab bar pusher threaded rod handle 64C at the bottom of the grab bar pusher threaded rod 64B, as shown in detail in FIG. 13. Unlock toggle clamp 54A, with the toggle base plate 54B on post on base plate 55 and grip latch plate 54C on the bottom of cover 53 on post on base plate 55, illustrated in FIG. 10. Remove cover 53 from post on base plate 55. Remove folding structure 66, with attached knee pad 71, as shown in FIG. 4 from the back of TW50 and in FIG. 5 once it is taken off TW50. Unfold the two sides so that the three pieces of folding structure 66 extend into one long piece, as shown in FIG. 15.

Lock and secure folding structure 66 using two toggle clamps 54A on either side of folding structure 66. Arrange folding structure 66, with knee pads 71 closest to the floor and facing away from grab bar on the wall 67. Place the bottom of folding structure 66 over post on base plate 55, ensuring that both pieces of a toggle clamp locking mechanism 54A are joinable, toggle base plate 54B on post on base plate 55, and grip latch plate 54C at the bottom of folding structure 66, and secure as detailed in FIG. 6 and FIG. 10. Temporarily fasten stabilizer belt 70, as detailed in FIG. 19, located on the back of folding structure 66, around stabilizer bar 65. At the top of folding structure 66 is the non-backdrivable gear system 69A; retrieve ratchet 62, as detailed in FIG. 7, from toolbox 51 and place it on extended knob on non-backdrivable gear system (69B), as shown in FIG. 19, turning ratchet 62 counterclockwise to release cable 69C fully. In continuing to build this portable sit-to-stand lift, remove handlebars 72, as detailed in FIG. 20, from the back of TW50, as shown in FIG. 4. Connect the handlebars to the folding structure correctly by connecting the attached extension pole 73 with ring 74 on handlebar extension pole 73, pointing ring 74 toward the ceiling, by placing handlebar extension pole 73 into the square hole sleeve on the middle section of folding structure 66, as detailed in FIG. 18. Connect the cargo hook on the end of cable 69D to ring on extension pole 74. Secure stand-assist sling 76A to the person sitting in TW50. Place the person's feet on base plate 52, toes forward, hands on handlebar 72, and knees on knee pad 71 while sitting in TW50.

Insert stand-assist sling loop straps 76B, as shown in FIG. 21, into the connection point on the extension for stand-assist sling loop straps 75A, as shown in FIG. 20. Place ratchet 62 on extended knob on non-backdrivable gear system 69B, and turn clockwise and retract cable 69C as far as possible. Move TW50 away from the sit-to-stand lift. Release the stabilizer belt 70.

To unlock gear system 56, use the operator's foot to move one of the two levers 57 on either side of base plate 52. After unlocking, rotate the person and the base plate 52 by 45 degrees so that the back of the person's legs contacts the front of the toilet seat. Once the rotation is complete, release lever 57 to lock base plate 52. Turn ratchet 62 counterclockwise to extend cable 69C on non-backdrivable gear system extended knob 69B to lower the person onto the toilet. To raise the person to a standing position, remove the user from the toilet and return them seated onto TW50; follow the steps in reverse order, including disassembling and storing the portable sit-to-stand lifts back onto TW50.

Advantages

Accordingly, the portable sit-to-stand lift device described in my patent offers several advantages as follows: this device can benefit any person who uses a transport wheelchair; it stows on a transport wheelchair; it opens a more expansive world to wheelchair users so they and their family members can access more locations in their community; it is light-weight for easy handling; it is much smaller than currently available devices and has the same lifting capacity; it uses a grab bar available to support loads and precludes the need for a broad and heavy base; tire winch carrier hoist generates the lifting forces, also considered a non-backdrivable gear system generates the lifting forces, rather than hydraulics, contributing to a device that is lightweight and portability. Other features in my portable sit-to-stand lift that provide functionality are ease of use, foldable parts, and a carrying container compatible with a transport wheelchair. It can lift people in a similar range of weights and heights as efficiently as commercial sit-to-stands; the time to assemble the device is minimal; and it has the potential to satisfy a broader range of users by adapting this design to accomplish a transfer into and out of a car. This portable sit-to-stand lift allows users to access it anytime at their convenience.

It frees the person from isolation, instills dignity and self-esteem in the user while engaging with their community, and assists the user in continuing to be a vital part of their community of family and friends. It contributes to the necessary resources for people who want to remain living independently.

Summary after Advantages

The portable sit-to-stand lift, stowed on a transport wheelchair device, will support the needs of those who use a transport chair and have little to no weight-bearing capabilities. They will be able to use a toilet while out in their community. This device enables a caregiver to assist someone in using a toilet in their community, wherever a handicap bathroom with a grab bar is present, using the grab bar and the non-back drivable gear system on this sit-to-stand lift. This device is stowed on their transport wheelchair for use when and wherever they are.

The invention claimed is:

1. An apparatus for transport wheelchair users comprising:
- a wheelchair,
- a portable stand-assist lift,
- and a removable toolbox located underneath a seat of the wheelchair,
- wherein the portable stand-assist lift is capable of being disassembled into components that are stowed within the removable toolbox and assembled for use,
- wherein the portable stand-assist lift components are stored in the toolbox,
- wherein the portable stand-assist lift components comprise:
  - a H-riser, a pusher rod, a grab bar pusher, a stabilizer bar, and a hand-held flexible ratchet,
- and wherein the portable stand-assist lift is attachable to the wheelchair.

2. The apparatus of claim 1, further comprising:
- a footrest, wherein the footrest is attachable to the wheelchair,
- wherein the footrest is also a base plate and further comprises:
  - an E-base, a locking gear system, and two locking gear levers,
- wherein the E-base enables the base plate to be stored in the toolbox and is a starting point for assembling the stand-assist lift,
- wherein the E-base and H-riser are connected and secured by two pins on either side of the E-base closest to the floor.

* * * * *